United States Patent Office 3,544,341
Patented Dec. 1, 1970

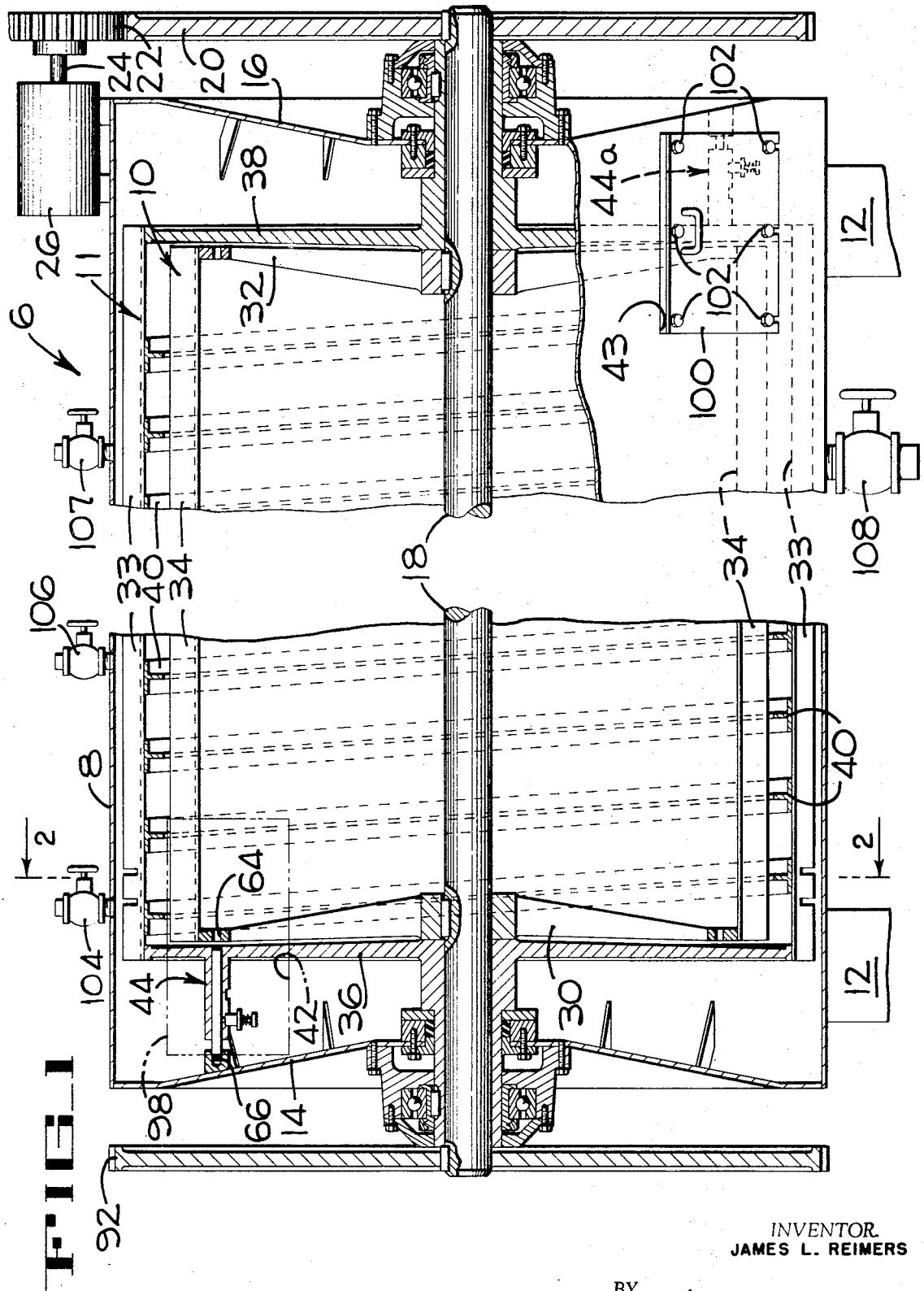

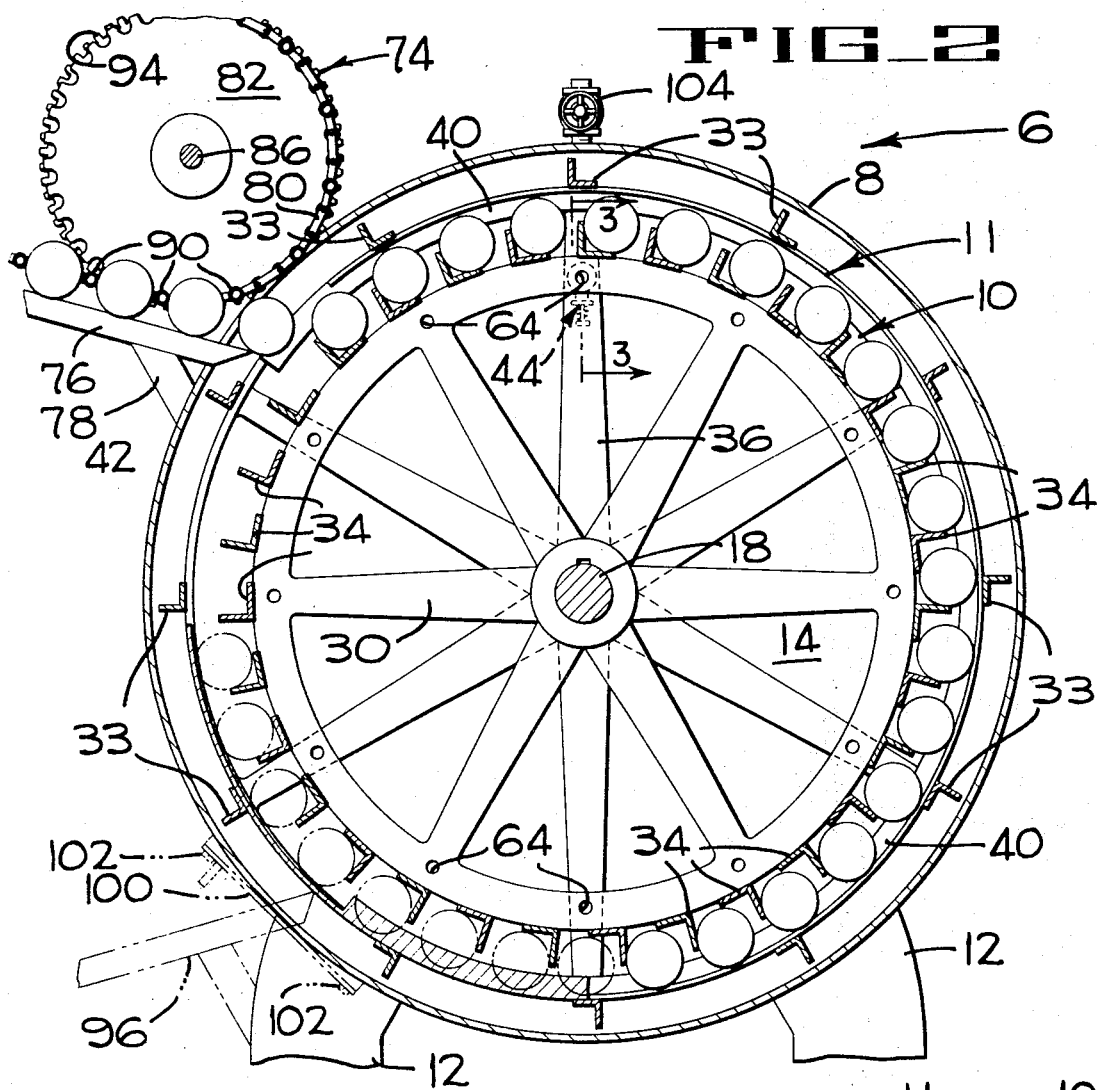
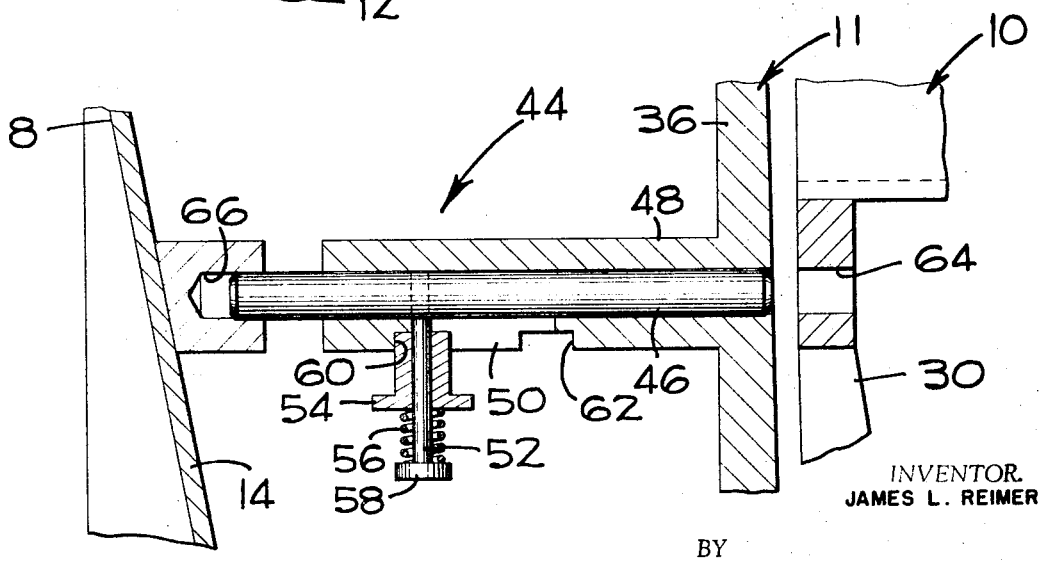

3,544,341
METHOD AND APPARATUS FOR COOKING AND COOLING FOODSTUFF WITHIN LARGE CONTAINERS
James L. Reimers, Santa Clara County, Calif., assignor to FMC Corporation, San Jose, Calif., a corporation of Delaware
Filed Nov. 23, 1966, Ser. No. 596,575
Int. Cl. A23l 3/06
U.S. Cl. 99—214      2 Claims

ABSTRACT OF THE DISCLOSURE

Foodstuff within large cylindrical containers, number 10 to one-gallon cans, are introduced on their sides into a rotary cooker and cooler comprising a housing enclosing a spiral which surrounds a reel. During input and discharge, the spiral is locked to the stationary housing and the reel rotates moving the containers in a helical path. During heat treatment, the spiral is locked to the reel and the combination of the reel, containers, and spiral rotate at high speeds in a circular path while permitting limited circumferential shifting of the containers.

CROSS-REFERENCE TO RELATED PATENTS

This invention is an improvement in the method of cooking and cooling large size cans suggested in U.S. Pat. No. 2,517,542 to Clifcorn et al. by means of rotary cooking and cooling apparatus employing a reel somewhat similar to that disclosed in U.S. Pat. No. 2,536,115 to Paul C. Wilbur. An apparatus for performing the Clifcorn method by rotating containers end-over-end is also disclosed in U.S. Pat. No. 2,697,665 to Olson.

BACKGROUND OF THE INVENTION

Reel and stationary spiral rotary cookers and coolers of the well known type disclosed in U.S. Pat. No. 2,536,115 to Paul C. Wilbur continuously advance containers therethrough while cooking and cooling the containers. During the cooking and cooling process the containers are usually passed through several heat treatment units, such as a rotary preheater, a rotary sterilizer, a rotary pressure cooler and a rotary atmospheric cooler. Because the continuously moving cans are disposed in moving contact with the spirals of the several heat treatment units, the can beads are subjected to considerable wear thereby making it undesirable to rotate the reels in excess of about 12 revolutions per minute.

It is also well known that for best heat transfer from the surfaces of each container to the center of a mass of flowable material within the container, the optimum speed of rotation of the reel should be much faster, for example about twice as fast as that of the reel speed which is now being used in standard rotary pressure cookers and coolers. The optimum speed of rotation, of course, changes with the size of the container and the material being cooked, and is determined to a large extent by the manner in which the speed of the containers varies the position of the noncondensable gas pocket or head space within the container. Control of the movement of the gas pocket in accordance with the present invention causes liquid within the containers to first sweep past the hot surfaces thereof and then move through the center of the container. Thus the circulating liquid distributes heat more uniformly through the contents of the container thereby reducing both the cooking and cooling time and also improving the quality of the final product.

It has long been known that the heating rate of cans filled with fluid could be altered by the mode of movement of the can and also by the speed of movement, speed of acceleration and other well known factors. A method for taking advantage of some of these factors is disclosed and claimed in the U.S. Pat. 2,517,542 to Clifcorn et al., in which he rotates the cans so that the mode is that of end-over-end at speeds whereby the head space bubble passes back through the center of the cans again and again. Unfortunately no commercially satisfactory means for loading and unloading No. 10 cans or larger in the end-over-end mode is known. The aforementioned Olson Pat. 2,697,665 discloses an apparatus for handling a limited volume of containers by the end-over-end Clifcorn et al. method. However, the Olson apparatus has not been commercially successful because the containers are on end and are slid, rather than being partially rolled, along the supporting surfaces of the spiral and reel. This manner of handling containers results in undesirable scratching and denting of the containers. The present method and apparatus undertakes to obtain some of the advantages of the Clifcorn process and of the phenomena represented thereby without the disadvantages of the Olson apparatus.

It is therefore one object of the present invention to provide an improved agitating rotary cooking and cooling apparatus.

Another object is to provide an improved method of cooking and cooling products within sealed containers.

Another object is to provide an improved rotary cooking and cooling apparatus and method which include introducing containers into a rotary cooker, positioning them helically about a reel, locking them to the reel, and rotating each container around circular path during processing. By locking is meant confining the containers from substantial movement or rotation relative to the reel so that they remain in the cooker during processing.

Another object is to provide a rotary cooking and cooling apparatus which includes means for supporting a batch of cylindrical containers on their cylindrical surfaces and for moving the batch of containers along a helical path during loading and unloading the same, and includes means for rotating each container around a cylindrical path during processing.

Another object is to provide a reel and spiral cooking and cooling apparatus for handling cylindrical containers on their sides, the apparatus having a spiral which is held in stationary position when the containers are fed into and discharged from the apparatus, and which is locked to the reel for rotation with the reel during the cooking and cooling operations.

DESCRIPTION OF THE INVENTION

FIG. 1 is a side elevation of the cooking and cooling apparatus of the present invention, certain parts being broken away and other parts being shown in central vertical section and in phantom.

FIG. 2 is a vertical section taken along lines 2—2 of FIG. 1 illustrating a fragment of a feed conveyor with the spiral of the apparatus being locked to the cooker housing.

FIG. 3 is an enlarged section taken along lines 3—3 of FIG. 2 illustrating the device for locking the spiral selectively to the housing or to the reel.

The present invention broadly contemplates a method and apparatus for cooking and cooling cylindrical containers wherein containers are advanced on their sides or cylindrical surfaces into axially elongated pockets of a reel, the containers are then locked to the reel for rotation therewith, the reel is then driven at a speed which causes centrifugal force at the center of gravity of the contents of the can to lie within a range of approximately ½ to 1½ of the weight of the contents, and the containers are released from the reel and discharged from the apparatus after completion of the cooking and cooling cycles.

The preferred embodiment of the cooking and cooling apparatus 6 (FIGS. 1 and 2) of the present invention in general comprises a cylindrical housing 8 having a reel 10 and spiral 11 mounted for rotation therein. The spiral 11 surrounds the reel 10, is locked to the housing 8 during feeding and discharging of containers therefrom, and is locked to the reel 10 for rotation therewith during cooking and cooling of the containers.

More particularly, the housing 8 is mounted in fixed position on legs 12 and has end plates 14 and 16 rigid therewith, which plates close the inlet end and outlet end of the housing, respectively. A reel drive shaft 18 is rotatably supported by the end plates 14 and 16 and extends concentrically through the housing 8. A large diameter drive gear 20 keyed to the shaft 18 is driven by a pinion 22 keyed to the drive shaft 24 of a variable speed motor 26 that is mounted on the housing 8.

The reel 10 comprises a pair of wheels 30 and 32 keyed to the shaft 18 adjacent the end plates 14 and 16, respectively, and include annular peripheral surfaces to which a plurality of evenly spaced container supporting angle bars 34 are secured. As indicated in FIG. 2, the angle bars 34 are spaced a sufficient distance apart to accommodate the particular size container being processed in such a way that each container may be slidably moved in its angle bar from one end of the housing to the other. As seen in FIG. 2, the bars 34 prevent the sides of adjacent cans from rubbing together but are spaced sufficiently to permit limited circumferential shifting of the containers.

The spiral 11 is provided in order to confine each container in its supporting angle bar, and during the loading and unloading operation to effect movement of each container axially of the housing along the associated supporting bars. The spiral 11 comprises spiral supporting wheels 36 and 38 rotatably supported by the end plates 14 and 16 and by the reel drive shaft 18 adjacent opposite ends thereof and being slightly larger in diameter than the wheels 30 and 32. A plurality of axially extending support bars 33 are secured to the outer periphery of the wheels 36 and 38 and have a generally helical spiral track 40 of T-shaped cross section rigidly secured thereto and extending the full length of the reel from a container inlet opening 42 to a container discharge opening 43. It will be understood that containers are supported on their sides and that the axial spacing between each adjacent winding of the track is slightly greater than the length of the containers being handled so as to accommodate and slidably engage the containers and guide them from one end of the cooking and cooling apparatus 6 to the other during loading and unloading. It is to be understood that the spiral track 40 need not necessarily be a true helix but, instead, may have all the spiral lead limited to the lower half of the track in the well known manner illustrated in the above referred to Wilbur patent. It is also obvious that when the cans are in the lower half of the spiral track the cans roll along the track, and if the spiral lead is limited to the lower half of the track, that the cans will be subjected to very little frictional wear.

As mentioned previously, the spiral 11 is locked to the housing 8 only during loading and unloading of the cooking apparatus 6 with containers, thereby permitting relative movement between the spiral 11 and containers at this time. The spiral is locked to the reel 10 during processing thereby preventing relative movement between the reel, spiral 11 and containers for confining the containers between the reel and spiral.

In order to lock the spiral to either the housing 8 or the reel 10, locking devices 44 and 44a are provided adjacent the ends of the housing 8. Since both locking devices are identical, only the device 44 near the inlet end will be described in detail.

The locking device 44 (FIG. 3) comprises a slidable rod 46 which is slidably received in a hub 48 formed on the spiral supporting wheel 36. The hub 48 is slotted at 50 to accommodate an actuating pin 52 secured to and projecting outwardly from the rod 46 through the slot. A flanged locking knob 54 is slidably received on the pin 52 and is urged toward the hub 48 by a spring 56 disposed between the knob 54 and an enlarged head 58 of the pin. The hub is provided with counterbores 60 and 62 which selectively receive the knob 54 and are effective for locking the rod 46, and accordingly the spiral 11, to the reel 10 or to the housing 8, respectively. When locked to the reel, one end of the rod 46 extends through a hole 64 in reel supporting wheel 30; and when locked to the housing 8, the other end of the rod extends through a hole 66 in the end plate 14.

When it is desired to lock the spiral 11 to the housing 8, the operator merely jogs the drive motor 26 until the rods 46 of each locking device become aligned with their associated holes 66 in the associated housing end plate 14 or 16, and then unlatches each knob 54 from the bores 62 and slides the ends of the rods into the holes 66 which withdraws the other end of the rod from the hole 64 in the reel 10. Thereafter, the operator releases the knob 54 of each device allowing it to become sealed in the associated bore 60. When it is desired to lock the reel 10 to the spiral 11 and unlock the spiral from the housing 8, the reel is first driven by jogging the motor 26 until one of the holes 64 is aligned with the rod 46 of each device 44 and 44a. The rod is then manually engaged with the hole 64 and disengaged from the hole 66 by reversing the above described latching procedure.

In order to direct cans into and out of the cooking and cooling apparatus 6 and to provide access to the locking devices 44 and 44a, the inlet opening or port 42 and the discharge opening or port 43 are provided near opposite ends of the housing 8. Containers are fed into the inlet port 42 by any suitable means such as by a free roller feed conveyor 74 and cooperating container supporting chute 76 of the type disclosed in Pat. No. 3,193,076 which issued to Creed on July 6, 1965. The conveyor 74 and chute 76 are supported by a frame 78 that is secured to the housing 8.

The feed conveyor 74 comprises a pair of parallel endless chains 80 (only one being shown) each trained around planar aligned pairs of sprockets 82 (only one being shown) journalled in the frame 78. A plurality of equally spaced rollers 90 are journalled on and extend transversely between the two chains and serve to accommodate one container between each adjacent pair of rollers 90. The conveyor 74 is driven in timed relation with the reel 10 by a gear 92 (FIG. 1) that is secured to the reel shaft 18 and engages a pinion 94 (FIG. 2) keyed to the conveyor shaft 86.

An inclined discharge chute 96 is secured to the housing 8 adjacent the discharge port 43 to allow containers discharged from the apparatus 6 to roll free of the apparatus.

After the cooking and cooling apparatus 6 has been filled with a batch of containers, it being understood that each batch includes slightly less than the total number of containers that can be fitted into the cooker so that each container will be positively confined from movement relative to the reel 10 and spiral 11 during the cooking process, the motor 26 is temporarily stopped and the spiral 11 is unlatched from the housing 8 and is locked to the reel 10 to rotate therewith. The inlet port 42 and discharge port 43 are then sealed in fluid tight engagement by gates of any suitable type such as gates 98 and 100, respectively, which are connected to the housing by bolts 102, only the gate 100 being shown in detail. It will of course, be understood that the feed chute 76 and discharge chute 96 will be withdrawn from the ports 42 and 43 when the gates 98 and 100 are bolted in place.

A valved steam inlet conduit 104, a valved cooling water inlet conduit 106, a valved high pressure air conduit 107, and a valved drain conduit 108 are connected to the housing 8 for selectively directing high pressure heating and cooling mediums into the housing and for selectively draining the heat treatment mediums from the housing.

In the operation of the cooking and cooling apparatus, the gates 98 and 100 are removed from the inlet and the discharge ports 42 and 43, respectively, and the spiral 11 is locked to the housing 8. The motor 26, which may be a variable speed motor, is then started and a batch of containers, such as No. 10, or gallon cans, are advanced by the feed conveyor 74 through the inlet port 42 and into registering engagement with the reel and spiral which advances the containers spirally through the cooking and cooling apparatus at a relatively low speed until the batch is completely loaded into the apparatus. The motor 26 is then stopped and the spiral 11 is unlocked from the housing 8 and locked to the reel 10 by the locking devices 44 and 44a. The gates 98 and 100 are then secured in pressure tight relationship to the inlet port 42 and discharge port 43 respectively, thereby sealing the ports and preparing the cooking and cooling apparatus 6 for its cooking cycle.

With the water inlet conduit 106 and drain conduit 108 closed, a heating medium under pressure, such as steam or a steam-air mixture as disclosed in the above referred to Wilbur patent, is directed through the conduits 104 and/or 107 and into the housing 8. The reel 10, with the spiral 11 locked thereto so that the containers are positively confined therein and do not move relative to either the reel or spiral, so as to maintain the charge pattern is then driven at a speed in excess of about 24 revolutions per minute when the radius of the reel about four feet. The high speed rotation of the reel causes the contents of each container to circulate past the surfaces of the containers and then through the centers thereof thereby greatly improving the heat transfer characteristics. After the contents of the containers have reached the desired temperature, the steam inlet conduit 104 is closed and a cooling medium such as water is introduced into the cooking and cooling apparatus 6 through the conduit 106. High pressure air is directed into the housing through the conduit 107 as required during the cooling process so as to prevent damage to the containers which might occur if a substantial pressure differential occurs between the internal and external surfaces of the containers.

The reel 10, spiral 11, and containers continue to rotate at the same rapid speed until the temperature of the containers has been reduced sufficiently to permit the containers to be released to the atmosphere without danger of damage to the containers due to an excessive pressure differential occurring between the internal and external surfaces of the containers.

After the temperature of the containers has been reduced as above described, the high pressure air conduit 107 is closed, the drain conduit 108 is opened and the cooling water is drained from the apparatus. The motor 26 is then stopped and the gates 98 and 100 are removed from the inlet port 42 and discharge port 43, respectively. The motor is then jogged until the slide rod 46 of each locking device 44 and 44a is aligned with the associated hole 66 in the end plates of the housing 8. The operator then reaches through the open inlet port 42 and open discharge port 43 to manipulate the locking devices 44 and 44a to unlock the spiral 11 from the reel 10 and lock the spiral 11 to the housing 8.

The motor 26 is then started driving the reel 10 relative to the stationary spiral 11 at a suitable speed depending upon the size of the cans thereby causing the processed containers to be driven spirally through the cooking and cooling apparatus and out the discharge port 43 for removal therefrom by the inclined chute 96. The cycle of operation is then repeated for the next batch of containers.

Since the specific operating temperatures, pressures, and times, varies with the size of the containers and the contents therein, they will not be set forth herein. It should be mentioned, however, that the speed of the reel and the spiral during processing is sufficient to cause centrifugal force at the center of gravity of the contents of each container to lie within the range of approximately ½ to 1½ of the weight of the contents of the containers.

From the foregoing description it is apparent that the preferred cooking and cooling method and apparatus of the present invention includes a spiral which may be first secured in a stationary position relative to a rotatable reel so that a batch of containers may be fed along a helical path into the apparatus; and secondly be secured to the reel to rotate therewith so that relative movement will not occur between the containers, reel, and spiral during the cooking and cooling process thereby allowing the containers to be rotated at a faster speed than heretofore possible. It will be apparent that means other than the spiral may be used to clamp the container to the reel during processing.

It is also apparent that the cooking and cooling apparatus is capable of cooking and thereafter cooling the containers within a single housing without requiring the use of separate housings for the several processing steps.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A method of cooking and cooling food products in large cylindrical containers which lie within a size range of between about No. 10 cans and one-gallon cans, in a generally horizontal cylindrical rotary cooker; comprising the steps of moving the containers along a generally helical path through the cooker to charge the cooker by simultaneously pushing the containers from one side and around the cooker along a radially inner zone of the helical path and pushing against the ends of the containers axially of the cooker along a radially outer zone of the helical path, said charging operation being performed at a slow rotational speed to avoid can damage, said containers being supported during the charging operation by laying them on their sides while preventing contact between the sides of adjacent containers but without completely confining the containers against some circumferential movement; stopping progress of the containers through the cooker while containing to support the resultant helical pattern of containers in the manner defined above, agitating the products in the charge of containers held in said generally helical pattern by rotating the containers around a circular path while permitting limited circumferential shifting of the containers, the rotational speed of the containers around said path being greater than 24 r.p.m., the radius of said circular path and the rotational speed being selected to cause the centrifugal force at the center of gravity of the contents of each container to be within the range of approximately ½ to 1½ of the weight of the container content; directing a heat transfer fluid into the cooker during said rotation of the charge therein; and thereafter removing the processed containers from the cooker by resuming their movement along a helical path in the manner by which they were charged into the cooker.

2. A rotary cooking and cooling apparatus comprising, means defining a cylindrical housing having end walls sealed thereto, said housing having a container inlet opening and a container discharge opening in its cylindrical surface, means for feeding containers into said inlet opening and for receiving processed containers discharged from said discharge opening, means for supplying heat transfer fluid into said housing, an axially elongated reel mounted for rotation in said housing, a plurality of evenly spaced elongated angle bars on the periphery of the reel defining pockets for accommodating containers disposed on their cylindrical surfaces, said angle bars precluding contact between successively fed containers and being spaced so as to permit sliding movement of the containers therealong from one end of said housing to the other; a spiral mounted for rotation in said housing and surrounding said reel, said spiral including spaced wheels, a plurality of spaced support bars secured to and extending between the outer periphery of said spaced wheel, and a spiral track of T-shaped cross section secured to the inner surfaces of said support bars and cooperating with said reel to accommodate and confine containers therebetween, variable speed drive means for driving said reel during a container feeding and discharging operation and for driving said reel and spiral with the containers locked therebetween as a unit at high speed during a heat treatment operation, and locking means remote from the containers and manually operated at the exterior of said spiral to said housing in stationary position or to said reel for rotation therewith and relative to said housing without damage to said containers, said containers being fed into and discharged from said housing when said spiral is locked in stationary position to define a feeding and discharging operation without marking the containers, and said concontainers, spiral, and reel being rotated relative to said housing at a high speed as a unit to agitate the contents of the containers when the spiral is locked to the reel to define a container heat treatment operation, said high speed being sufficient to cause centrifugal force at the center of gravity of the content of each container to lie within the range of approximately one-half to one and one-half the weight of the contents of the containers, said manually operated locking means including means defining a first rod receiving opening connected to and rotatable with said reel, means defining a second rod, receiving opening connected to and rotatable with said spiral, stationary means defining a third rod receiving opening connected to said housing, manually positionable rod means selectively positioned either in said first and second rod receiving openings or in said second and third rod receiving openings, and means for latching said rod means into selected position.

References Cited

UNITED STATES PATENTS

| | | | |
|---|---|---|---|
| 755,392 | 3/1904 | Rumberg | 292—145 |
| 1,721,562 | 7/1928 | Keeney | 99—365 |
| 2,081,446 | 5/1937 | Brett | 214—17.4 |
| 2,517,542 | 8/1950 | Clifcorn et al. | 99—214 |
| 2,536,116 | 1/1951 | Wilbur | 99—214 |
| 2,697,665 | 12/1954 | Olson | 99—214 |
| 3,347,155 | 10/1967 | Mencacci | 99—365 |
| 1,483,325 | 2/1924 | Bishop et al. | 99—371 |

A. LOUIS MONACELL, Primary Examiner

S. B. DAVIS, Assistant Examiner

U.S. Cl. X.R.

99—365, 371